Dec. 22, 1925.

J. J. WARD

FISH NET

Filed Sept. 28, 1925

1,566,637

INVENTOR
James J. Ward.
By W.L. Dempsey
ATTORNEY

Patented Dec. 22, 1925.

1,566,637

UNITED STATES PATENT OFFICE.

JAMES J. WARD, OF ST. LOUIS, MISSOURI.

FISH NET.

Application filed September 28, 1925. Serial No. 59,093.

*To all whom it may concern:*

Be it known that I, JAMES J. WARD, a citizen of the United States, residing in the city of St. Louis, State of Missouri, have invented a certain new and useful Improvement in Fish Nets, of which the following is a full, clear, and exact specification.

My invention relates to fish nets and in particular to that class of fish nets used in fishing in the channels of streams.

The object of my invention is to provide a net of relatively large capacity that may be operated in connection with a boat or scow, either when anchored or when moving in the channels of streams.

A further object of my invention is to provide a channel net that may be secured at one end to a boat or scow and be readily operated by one or more men.

Other objects and advantages of my invention will be apparent from the specification and claims as also from the drawings, in which:

Figure 1:
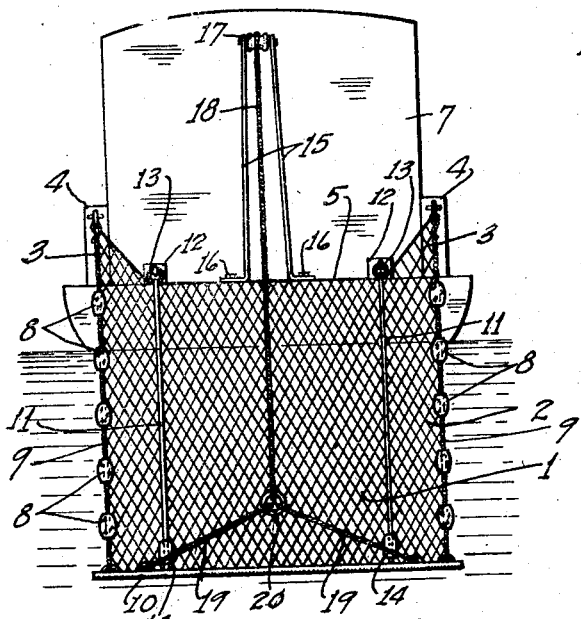
Fig. 1 is a front view of a net being lowered into the water.
Figure 2:
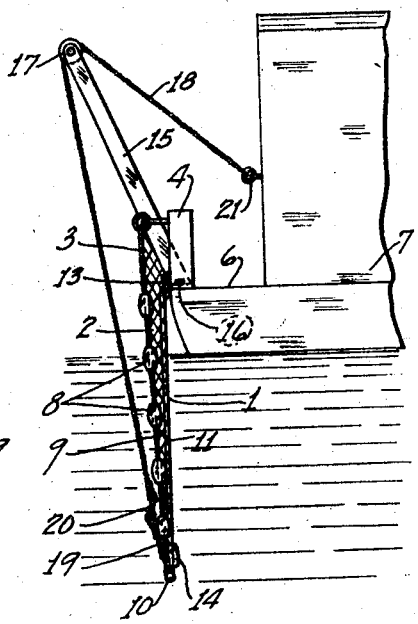
Fig. 2 is a side elevation of a net when lowered into the water.
Figure 3:
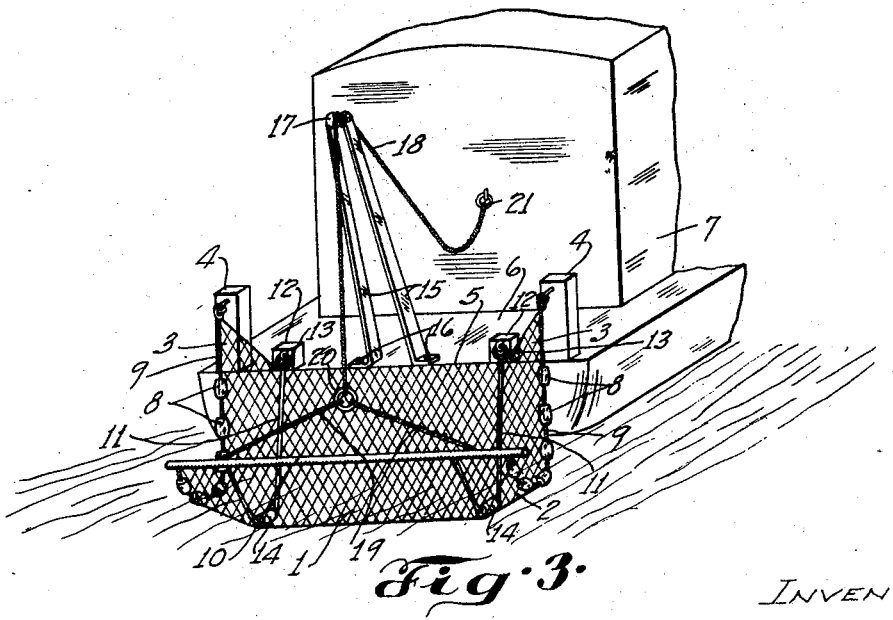
Fig. 3 is a perspective view of a net being drawn out of the water.

It is well known that many species of fish in migrating follow the channel of a stream, which is often of such depth that the ordinary drop net or seine cannot be successfully used. It is, also, well understood that the weight of a net or seine of suitable dimensions for channel fishing is so great that it cannot be readily operated by a single person.

In order to meet these objections and difficulties, I have provided a net that may be readily attached to the end of a scow or barge, either when anchored or moving with or against the current of the stream in such a manner that the opposite end of the net may be lowered to the bottom of the channel and then drawn upwardly by a single individual, either by the use of a windlass, not shown, or by simply pulling it up by means of a rope and pulley.

The main body portion 1 of the net may be formed of any suitable material such as is commonly used by fishermen for making nets, having the mesh 2 of a size suitable for the class of fish sought. The body of the net is substantially rectangular in shape, except that its upper end is provided with wings 3 adapted to be secured to posts 4. The purpose of the wings 3 is to prevent the loss of fish overboard when the net is drawn up, the wings in that case forming a pocket to prevent the escape of the catch laterally.

The upper end 5 of the net is secured to the floor-board 6 of a boat 7. The sides of the net are provided with a plurality of floats 8, suitably mounted upon strong cords 9, the upper ends of the cords being attached to the posts 4, and the lower ends of the cords being attached to the ends of the crossbar 10, made of metal of sufficient weight to hold the bottom of the net beneath the water when in use.

A plurality of flexible wires or cords 11 have their upper ends attached to posts 12 by means of rings 13, their lower ends being attached to the crossbar 10.

Suitable weights 14 are slidably disposed upon the flexible wires or cords 11, the purpose of which is to hold the net down when in use and to cause the net to "purse" when being withdrawn from the water.

Suitable booms or beams 15 are bolted at 16 to the floor-board 6 of a boat 7 and carry a rotatable roller 17, in the place of which, if desired, any form of pulley block may be used.

A rope 18, made fast at its lower end to the cross bar 10 by two branches 19 joined together by a ring 20, or other suitable means, is then passed over the pulley or roller 17 and for security may be attached as at 21 to any part of the boat 7.

It is obvious that by suitable adjustment of the rope 18, the net can be sunk to any desired depth and held stationary by securing the rope 18 to its fastening 21. It is, also, apparent that the net may be operated by one or more persons, depending upon the size of the net and the depth of the water.

Should it be desired to fish in waters of great depth, it would of course require a net of longer body than when used in shallow streams.

The contour of the net when in use, that is to say the amount of "pursing" desired, will depend upon the difference in weight between the weights or sinkers 14 and the corks or floats 8. By properly adjusting the relation between these two, the pursing effect may be changed at will.

When the boat 7 is travelling forward, the net will necessarily be at less than a straight angle to the longitudinal axis of the boat, depending upon the adjustment of the rope 18, so it will be readily understood that my improved net can be adjusted to suit both the depth of the water and the swiftness of the current. It can likewise be adjusted to suit conditions when a vessel is anchored or when moving at a fast or slow rate of speed.

Having fully described my invention and the method of its construction, what I claim as new and useful and desire to secure by Letters Patent is:

1. A fish net of the character described, comprising a substantially rectangular body portion the upper end of which is adapted to be affixed to the deck of a boat, the lower end of said body portion being attached to a metal bar disposed transversely to said body portion and having sufficient weight to cause the said body portion to be drawn taut when depending into the water, triangular winged portions attached to the upper corners of said body portion so that the base of the triangle will coincide with the minor axis of the body portion and the perpendicular side of the triangular portion of said wings will be disposed parallel to the major axis of the main body of the net.

2. A fish net of the class described, comprising a body portion adapted to be affixed at one end to the end of a boat and the opposite end being adapted to be sunk into the channel of a stream and held taut by means of a transverse metal bar affixed to said opposite end, wings attached to the longitudinal marginal edges of said body portion, a plurality of floats attached to the outer longitudinal marginal edges of said wings whereby said wings will be disposed on a plane vertical to the plane of the body portion when immersed in water, means for raising and lowering said net into and out of a stream and means for suspending said net at any predetermined depth.

3. A fish net of the character described, comprising a main body portion, side wings adapted to be held in a vertical plane by a plurality of floats, a transverse metal bar attached to the lower end of said main body portion, a plurality of flexible members attached at one end to the stern of a boat and attached at the opposite end to the said transverse bar, said flexible members being disposed longitudinally upon the upper side of said main body portion, a plurality of sinkers slidably threaded upon said flexible members adapted to cause said main body portion to sink when being lowered into a stream and, also, to cause said main body portion to purse when being drawn up out of a stream.

In witness whereof I have hereunto affixed my signature this 19 day of September, 1925.

JAMES J. WARD.